Nov. 12, 1957     J. E. HOLT     2,812,668

COMPOSITE WORM-HELICAL GEAR CONSTRUCTION

Filed April 11, 1955

INVENTOR.
John E. Holt
BY Nathaniel Frucht
atty

United States Patent Office 2,812,668
Patented Nov. 12, 1957

2,812,668

COMPOSITE WORM-HELICAL GEAR CONSTRUCTION

John E. Holt, Danielson, Conn., assignor, by mesne assignments, to The Danielson Manufacturing Company, a corporation of Rhode Island Application April 11, 1955, Serial No. 500,494

2 Claims. (Cl. 74—458)

The present invention relates to gear constructions, and has particular reference to the manufacture of molded gears for use with worm gear drives.

The principal object of the invention is to provide a composite worm-helical gear which may be readily molded from plastics such as nylon.

Another object of the invention is to provide a molded gear for a worm drive which has a very substantial surface contact between the worm and the gear teeth.

A further object of the invention is to provide a molded gear for a worm drive which includes a contact ridge which prevents the worm from riding off the gear in at least one direction.

With the above and other objects and advantageous features which will become apparent as the description proceeds, the invention consists of a novel method of forming a master gear and a novel composite gear more fully disclosed in the detailed description thereof, in conjunction with the accompanying drawings, and more specifically defined in the claims appended thereto.

It has been found desirable to utilize a gear of molded material, preferably nylon, for engagement with a worm drive. It is not, however, possible to mold a true worm gear and at the same time hold the very close tolerances required for such a gear, as the peripheral undercut prevents ejection of the molded parts from a metal cavity.

It has therefore become standard practice to utilize a helical gear type when a molded gear is desired for mating with a worm drive. However, the relatively small tooth surface engagement between a worm drive and a helical gear is too weak to withstand shock loads, and the nylon teeth tend to and do strip or the gear deflects to an extent which permits the worm to ride off one side of the gear.

I have therefore devised a composite worm and helical gear structure which provides a substantial tooth engagement with a worm drive, thus eliminating stripping of the driven gear teeth and also providing a ridge at one side which locks the worm gear against riding off said side.

Figure 1:
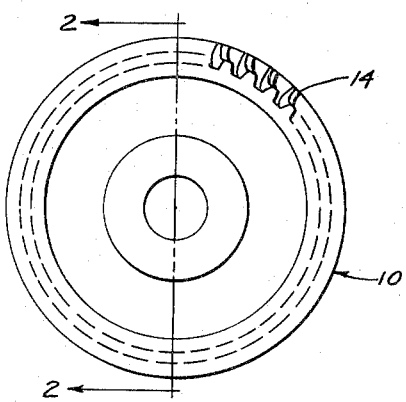
Fig. 1 is a front elevation of an illustrative composite gear embodying the invention.
Figures 2, 3:
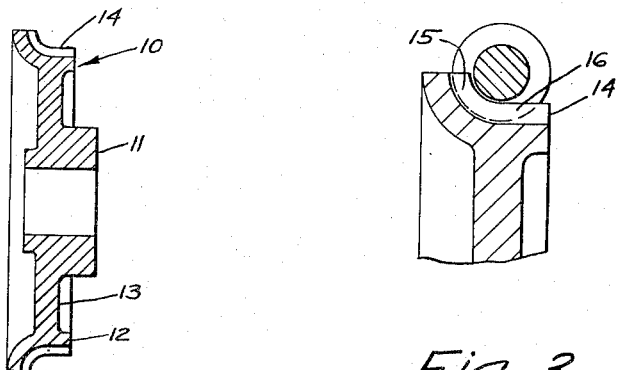
Fig. 2 is a vertical section of Fig. 1 on the line 2—2 thereof.
Fig. 3 is an enlarged detail section showing the area of tooth mating of the composite gear of Fig. 1 with a worm.

Referring to the drawings, the gear 10 includes the usual hub 11, rim 12, supporting web 13, the rim having composite teeth 14 which includes an arcuate worm portion 15 of a length corresponding to the diameter of the worm drive used and the thickness of the drive worm, and subtending an angle up to 90 degrees, and an axial portion 16 which is generally axial as illustrated. The teeth 14 thus engage a worm drive as illustrated in Fig. 3, with the worm 16 engaging the teeth 14 for substantially 135 degrees.

In molding the gear, a master gear is first made, from which a cavity mold is cast, the master gear being cut with worm gear cutting equipment and then backed off to one side, thus providing helical gear extensions for the worm gear channels.

An illustrative composite gear has the following dimensions:

| | |
|---|---:|
| Pitch angle | 20° |
| Number of teeth | 46 |
| Normal pitch diameter | .20 |
| Normal circ. pitch | .15708 |
| O. D | 2.415± |
| P. D | 2.335 |
| R. D | 2.235± |
| Helix angle, L. H | 9°56'± |
| Normal circ. tooth thickness | .0785 |

In a gear of the above dimensions, the outside diameter is 2.633, the axial length of the helical tooth portion is .175 inch, and the radius of pitch diameter for the worm portion is .149 inch; the total tooth width is .474 inch.

Although I have disclosed a specific tooth construction for a specific composite gear, changes in the size and dimensions of the parts to meet different composite tooth requirements may be made to meet different requirements, without departing from the spirit and the scope of the invention as defined in the appended claims.

I claim:

1. A composite gear having a hub, a rim, and transverse teeth on said rim, said teeth each having a worm portion and a helical portion.

2. In the gear of claim 1, said worm portion having an arc not exceeding 90 degrees, and said helical portion being generally axial.

References Cited in the file of this patent

UNITED STATES PATENTS 493,493   Fowler _____ Mar. 14, 1893